R. B. HOUSLEY.
TAP AND GAGE THEREFOR.
APPLICATION FILED FEB. 1, 1915.
1,199,009.
Patented Sept. 19, 1916.
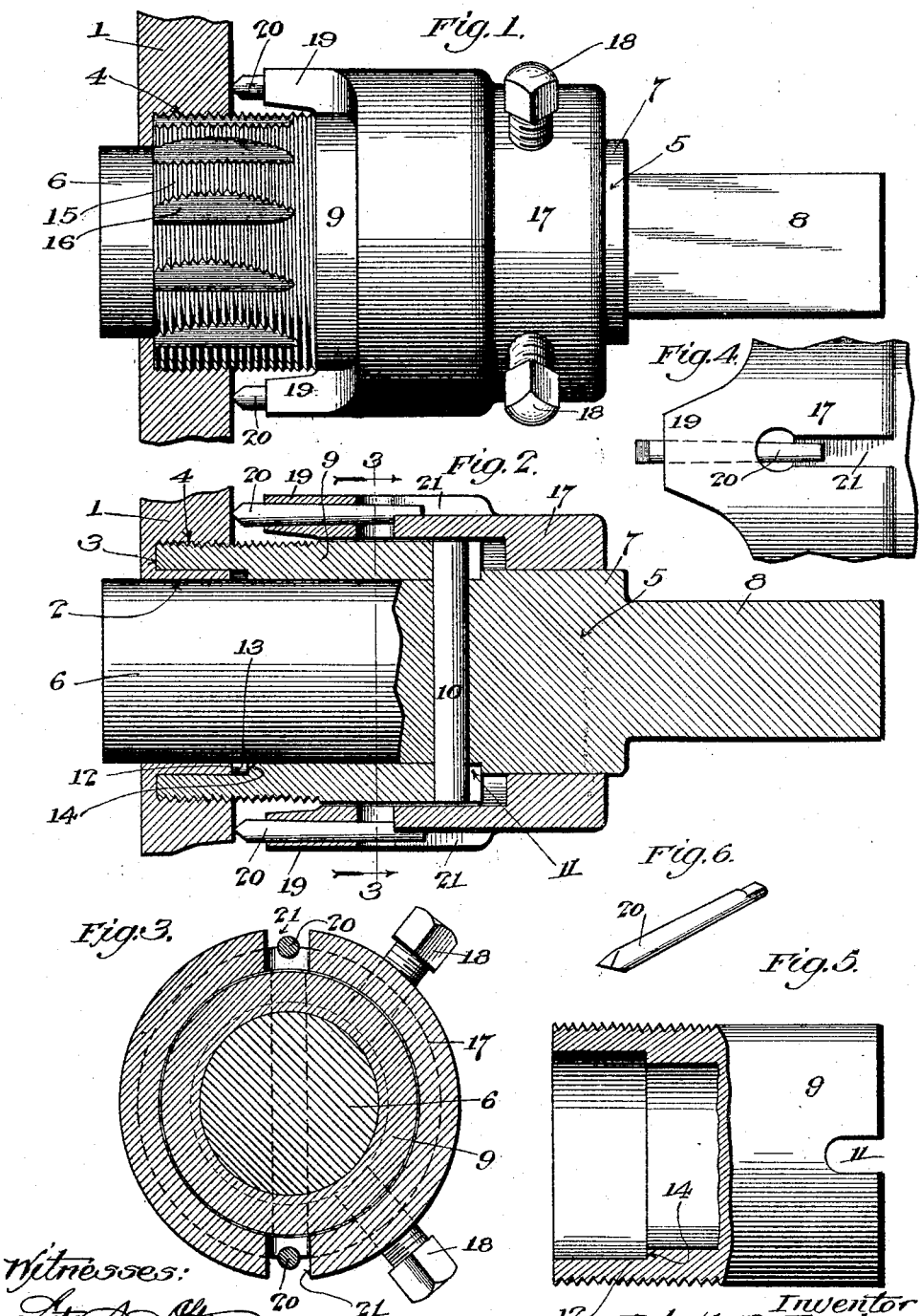
Inventor:
Robert B. Housley,
By Frederick W. Hyou
Attorneys

UNITED STATES PATENT OFFICE.

ROBERT BANNEY HOUSLEY, OF LOS ANGELES, CALIFORNIA.

TAP AND GAGE THEREFOR.

1,199,009. Specification of Letters Patent. Patented Sept. 19, 1916.

Application filed February 1, 1915. Serial No. 5,433.

*To all whom it may concern:*

Be it known that I, ROBERT B. HOUSLEY, a citizen of the United States, residing at Los Angeles, in the county of Los Angeles and State of California, have invented a new and useful Tap and Gage Therefor, of which the following is a specification.

One of the objects of this invention is to provide a tap designed especially for tapping grooves concentric with an opening, such as the flue receiving grooves shown in my Patent No. 1,080,009.

Another object of the invention is to provide a gage which will indicate the distance which the tap has moved into the groove.

With these and other objects in view, the invention consists of certain novel features of construction, combination, and arrangement of parts as will be hereinafter fully described, illustrated and claimed.

Referring to the drawings: Figure 1 is a side elevation showing the tap and gage in conjunction with a section of the fire sheet. Fig. 2 is a longitudinal sectional view. Fig. 3 is a transverse section on the plane of line 3—3 of Fig. 2. Fig. 4 is a detail view showing one of the gage pins and a portion of the gage. Fig. 5 is a side elevation partly in section of the sleeve of the tap; and Fig. 6 is a detail perspective view of one of the gage pins.

Referring in detail to the drawings by numerals, 1 designates a fire sheet having a circular opening 2 extending entirely therethrough, said opening being surrounded by a concentric groove 3 opening upon the inner face of the fire sheet. The outer wall 4 of the groove must be threaded to connect with a flue and the tap forming the subject matter of this invention is designed especially for this purpose, and of course may be used in other analogous ways. The shank 5 of the tap has an outer portion 6 circular in cross section and of a somewhat smaller diameter than the circular intermediate portions 7. The inner portion 8 of the shank is squared for connection with suitable rotating means. A sleeve 9 fits on the outer cylindrical portion 6 and is secured thereto by a cross pin 10, the ends of which project into the open ended slots or notches 11. The sleeve terminates short of the outer end of the shank and is of an enlarged interior diameter adjacent its outer end forming the off-set portion 12 which coöperates with the reduced portion 6 of the shank to form an annular pocket 13 closed at its inner end by the shoulder 14. The tap is threaded as at 15 and provided with the flutes 16.

In operation the outer end of the sleeve 9 works its way into the annular groove 3 forming threads on the outer wall thereof. The reduced portion 6 of the shank makes a sliding fit with the opening 3 in the fire plate and steadies the tap as it makes the threads.

In order to indicate to the operator when the bottom of the annular groove 3 is reached by the sleeve of the tap, I provide a gage 17 having a hollow cylindrical body which fits on the intermediate portion 7 of the shank and which is secured thereto by set screws 18. The body is diametrically enlarged adjacent its outer end to accommodate the sleeve 9 of the tap and is formed with two extensions 19 which are longitudinally bored to receive the gage pins 20. The inner ends of these pins project into grooves or channels 21 formed in the outer face of the body of the gage and make it easy to insert a tool for displacing the pins. The gage may be adjusted on the shank of the tap by loosening the screws 18 and when in working order is set so that the tapered ends of the gage pins will contact the inner face of the fire plate when the tap sleeve is at the bottom of the annular groove 3. If it were not for the gage the operator would not know when to stop the rotation of the tap, and therefore the threads of the tap would very likely be stripped and the tap ruined.

While I have shown and described the preferred embodiment of my invention, it will be understood that minor changes in construction and arrangement of parts may be made without departing from the spirit and scope of the invention as claimed.

What I claim is:

1. A tap comprising a shank, and a sleeve around said shank, the sleeve being formed with external cutting threads and being spaced from the shank adjacent its outer end providing an annular pocket encircling the shank.

2. A tap comprising a shank squared on its inner end, a sleeve encircling the shank, and means for holding the sleeve against rotation relative to the shank, the sleeve being formed on its periphery with cutting threads and being of an enlarged internal diameter adjacent its outer end to provide an annular pocket surrounding the shank.

3. A tap comprising a shank, and a sleeve mounted upon and encircling said shank, said sleeve having cutting threads upon its periphery at one end thereof and being spaced circumferentially at said end from the shank to form an annular pocket between itself and the shank, said shank extending beyond the threaded end of the sleeve.

In testimony whereof, I have hereunto set my hand at Los Angeles, California, this 7th day of January, 1915.

ROBT. BANNEY HOUSLEY.

In presence of—
 Lora M. Bowers,
 L. Belle Weaver.

Copies of this patent may be obtained for five cents each, by addressing the "Commissioner of Patents, Washington, D. C."